(12) United States Patent
Costa et al.

(10) Patent No.: US 12,438,999 B2
(45) Date of Patent: Oct. 7, 2025

(54) DYNAMIC MAGNETIC PROTOCOL

(71) Applicant: Varex Imaging Corporation, Salt Lake City, UT (US)

(72) Inventors: Marcelo C Costa, Draper, UT (US); Carlo Tognina, Salt Lake City, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 358 days.

(21) Appl. No.: 18/192,264

(22) Filed: Mar. 29, 2023

(65) Prior Publication Data

US 2023/0318659 A1    Oct. 5, 2023

Related U.S. Application Data

(60) Provisional application No. 63/327,793, filed on Apr. 5, 2022.

(51) Int. Cl.
*H04N 5/32*    (2023.01)
*H04B 5/70*    (2024.01)
*H04B 5/26*    (2024.01)

(52) U.S. Cl.
CPC ............ *H04N 5/32* (2013.01); *H04B 5/70* (2024.01); *H04B 5/26* (2024.01)

(58) Field of Classification Search
CPC ... H04B 5/26; H04B 5/70; H04B 5/72; H04N 5/32
USPC ........................................... 455/41.1
See application file for complete search history.

(56) References Cited

U.S. PATENT DOCUMENTS

| | | |
|---|---|---|
| 7,471,967 B2 | 12/2008 | Kang et al. |
| 9,383,852 B2 | 7/2016 | Kim |
| 10,571,973 B2 | 2/2020 | Xu et al. |
| 2011/0204883 A1 | 8/2011 | Konno et al. |
| 2012/0253426 A1 | 10/2012 | Ellingson et al. |
| 2016/0023002 A1 | 1/2016 | Schulhauser et al. |
| 2016/0175091 A1* | 6/2016 | Van Heugten ............ A61F 2/14 623/6.22 |
| 2019/0167215 A1 | 6/2019 | Kim et al. |
| 2020/0067341 A1* | 2/2020 | Glover .................... H02J 50/80 |

(Continued)

FOREIGN PATENT DOCUMENTS

JP    2011062425    3/2011

OTHER PUBLICATIONS

Int'l Appl. No. PCT/US2023/065247, International Search Report dated Jul. 26, 2023.

(Continued)

*Primary Examiner* — Ajibola A Akinyemi
(74) *Attorney, Agent, or Firm* — Dorsey & Whitney LLP (57) ABSTRACT

Some embodiments include a device, comprising: a housing; a circuit disposed in the housing, including a sensor array configured to generate electrical signals based on incident x-rays; a memory configured to store data for a plurality of configurations for the circuit; at least one magnetic sensor disposed in the housing; control logic disposed in the housing and configured to: receive a signal from the at least one magnetic sensor; select from among the configurations for the circuit based on the signal received from the least one magnetic sensor; and change an operation of the circuit by applying the data associated with the selected configuration to the circuit.

18 Claims, 10 Drawing Sheets

(56) References Cited

U.S. PATENT DOCUMENTS

2020/0166992 A1\* 5/2020 Kim ................. G06F 3/011
2020/0167631 A1\* 5/2020 Rezgui ............... B25J 9/0084

OTHER PUBLICATIONS

Int'l Appl. No. PCT/US2023/065247, Written Opinion dated Jul. 26, 2023.

\* cited by examiner

DYNAMIC MAGNETIC PROTOCOL

Various communication techniques such as near-field communications (NFC), infrared (IR), Bluetooth, and other communication protocols may be used to communicate with devices such as flat panel imagers. These communication techniques may be relatively expensive and may require antennas that cannot be blocked by an electromagnetic interference shield.

DETAILED DESCRIPTION

Some embodiments address major shortcomings of near-field communications (NFC), infrared (IR), Bluetooth, and other communication protocols used to communicate certain information between x-ray detectors, such as flat panel imagers, and the overall OEM x-ray systems. Existing technologies may be relatively expensive to certify or complex to implement.

In addition, some of the existing technologies and protocols require antennas that cannot be blocked by metal or require cavities in the metal housing that prevents or makes it very difficult to achieve an IP68 ingress protection rating. Housing designs which require cavities for antennas or openings for optical sensors can be more susceptible to electromagnetic interference (EMI) or emit more EMI as any opening in the housing may reduce the effectiveness of the faraday cage.

Some embodiments include a communication protocol based on a static or dynamic magnetic field. The protocol allows for a variety of information to be communicated, such as commands or data, via magnetic fields. In some embodiments, using a dynamic magnetic field, the magnetic field may be modulated to transmit information to the system without changing the existing hardware, such as the x-ray detector. For example, some x-ray detectors may include one or more magnetic sensors. The operation of the system may be improved by changing how the system responds to signals received by the magnetic sensors.

In some embodiments, using magnetic fields for communication may not require any openings in the panel housing, thus enabling IP68 compliant designs. Some embodiments also may not require changes to the panel housing metallization and may therefore not degrade EMI susceptibility or EMI emissions.

Figure 1A:
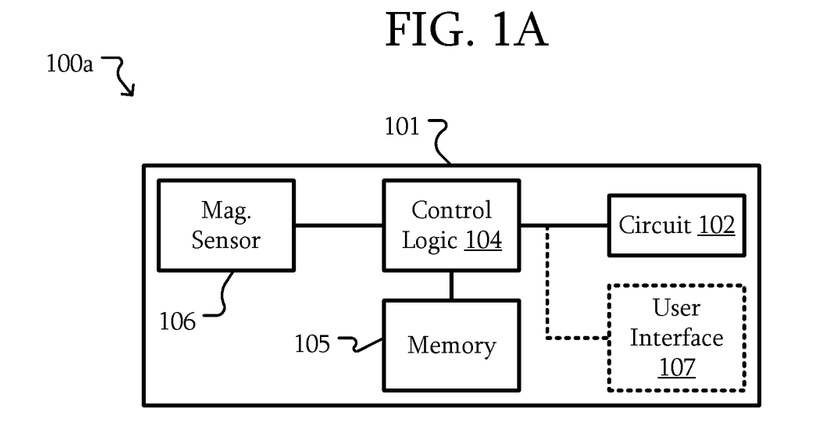
FIG. 1A is a block diagram of device with a magnetic sensor according to some embodiments.

FIG. 1A is a block diagram of device with a magnetic sensor according to some embodiments. A device 100 may include a housing 101. A circuit 102 may be disposed in the housing. The circuit 102 may be any circuit that is configurable, controllable, or the like. As will be described in further detail below, a specific example of the circuit 102 may include a network communication interface, an x-ray detector including the network communication interface, or the like.

The device 100 may include control logic 104. The control logic 104 may include a general purpose processor, a digital signal processor (DSP), an application specific integrated circuit (ASIC), a microcontroller, a programmable logic device (e.g., field-programmable gate array (FPGA)), discrete circuits, a combination of such devices, or the like. The control logic 104 may include external interfaces, such as address and data bus interfaces, interrupt interfaces, or the like. The control logic 104 may include other interface devices, such as logic chipsets, hubs, memory controllers, communication interfaces, or the like to connect the control logic 104 to internal and external components. The control logic 104 may be configured to control the variety of operations described herein. In particular, the control logic 104 may be configured to control the circuit 102.

The device 100 includes a magnetic sensor 106. Examples of magnetic sensors include hall effect sensors, magneto-resistive sensors, coils, or the like. The magnetic sensor 106 is coupled to the control logic 104. The magnetic sensor 106 may be configured to generate a signal based on a received magnetic field.

The control logic 104 may be configured to receive a signal from the at least one magnetic sensor 106. The control logic 104 may be configured to change an operation of the circuit in response to the signal received from the least one magnetic sensor 106.

The use of a magnetic sensor 106 may not require additional certifications, such as regulatory certifications. As a result, the device 100 may be introduced into a variety of jurisdictions that have independent certification requirements without the expense and/or delay of additional certifications.

In some embodiments, the device 100 may include a memory 105. The memory 105 may include any suitable memory resource, such as volatile memory, non-volatile (NV) memory, random access memory (RAM), dynamic RAM (DRAM), synchronous DRAM (SDRAM), static RAM (SRAM), cache memory, and/or the like. The NV memory may include any suitable non-transitory, persistent, and/or NV storage resource, including, but not limited to a non-transitory storage device, a persistent storage device, an internal storage device, an external storage device, a remote storage device, Network Attached Storage (NAS) resources, a magnetic disk drive, a hard disk drive (HDD), a solid-state storage device (SSD), a Flash memory device, and/or the like.

The memory 105 may store data associated with multiple configurations for the circuit 102. For example, the data associated with the configurations may include firmware, addresses, identifiers, passwords, commands, instructions and settings used to operate the device 100 or to communicate with other devices or systems, or the like. In some embodiments, a configuration may include multiple types of such information. Based on the signal from the magnetic sensor 106, the control logic 104 may select from among the configurations stored in the memory 105. The control logic 104 may be configured to change the operation of the circuit 102 in response to the selected configuration. For example, firmware, network configurations, detector unique identifier (ID), detector name, addresses, identifiers, passwords, or the like of the circuit 102 may be changed. The control logic 104 may be configured to retrieve the particular data associated with the configuration and apply that data to the circuit 102. Applying the data to the circuit 102 may include loading the data into a processor, memory, programmable logic device, or other component of the circuit 102. In some embodiments, a selected command may be sent to the circuit 102. For example, a selected command may include commands that cause the circuit 102 or device 100 to shutdown, reboot, perform a factory reset, turn off, enter a self-test mode, enable/disable temperature sensors, enable/disable voltage sensors, enable or disable wireless radio, or the like. In other embodiments, the control logic 104 may be configured to pass information such as an image number for an image acquired on an autonomous trigger. On an autonomous trigger, images may be acquired without a computer or a separate computer. A portable device may be configured to create the modulation and pass to the system the number of images it should take or pass unique identifier for each image.

In some embodiments, the device 100a includes a user interface 107. The user interface 107. The user interface 107 may include part of the circuit 102, may be incorporated in the circuit 102, or the like. The user interface 107 may allow a user to interact with the device 100a. For example, the user interface 107 may include a touch screen, keyboard, display, switches, knobs, dials, or the like.

Figure 1B:
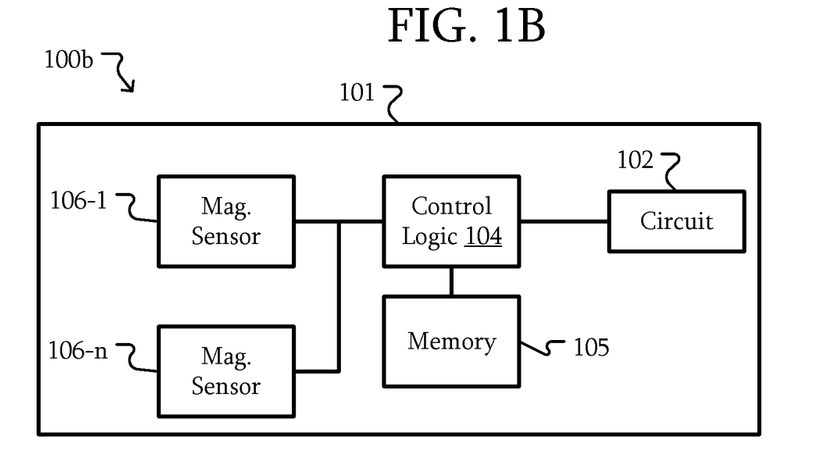
FIG. 1B is a block diagram of device with multiple magnetic sensors according to some embodiments.

FIG. 1B is a block diagram of device with multiple magnetic sensors according to some embodiments. The device 100b may be similar to the device 100a described with respect to FIG. 1A. However, in some embodiments, the device 100b includes multiple magnetic sensors 106-1 to 106-n. The number of magnetic sensors 106 may be any number greater than one. In some embodiments, the magnetic sensors 106 are identical; however, in other embodiments, the magnetic sensors 106 may be different. For example, magnetic sensor 106-1 may be a hall effect sensor while magnetic sensor 106-n may be a coil.

Figure 2:
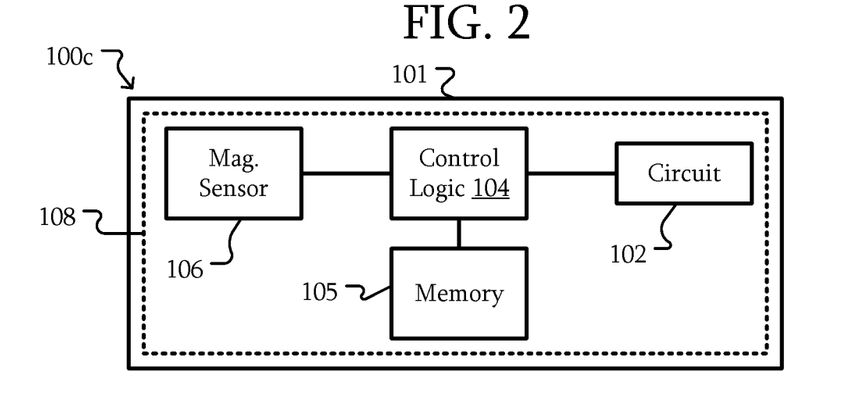
FIG. 2 is a block diagram of device with a magnetic sensor and an electromagnetic interference (EMI) shield according to some embodiments.

FIG. 2 is a block diagram of device with a magnetic sensor and an electromagnetic interference (EMI) shield according to some embodiments. In some embodiments, the device 100c may be similar to the systems 100a-b. Only a single magnetic sensor 106 is illustrated for clarity; however, in device 100c and other devices 100 described below, the device 100 may include multiple magnetic sensors 106 as described with respect to FIG. 1B.

The device 100c includes an EMI shield 108. The EMI shield 108 is configured to reduce or eliminate electromagnetic interference, but permit at least some magnetic fields. For example, the EMI shield 108 may include a conductive foil, conductive coating, a conductive housing, a combination of such structures or the like that forms a faraday cage. A static magnetic field and/or a relatively slowly changing dynamic magnetic field may pass through the EMI shield 108. Accordingly, the magnetic sensor 106 may be disposed within the EMI shield.

Figure 3A:
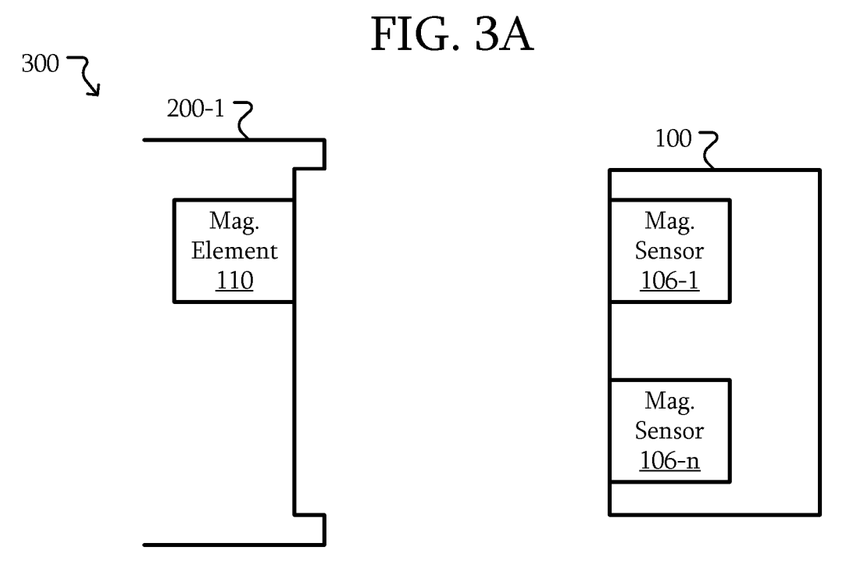
FIGS. 3A-3B are block diagrams of a system including a device with a magnetic sensor according to some embodiments.
Figure 3B:
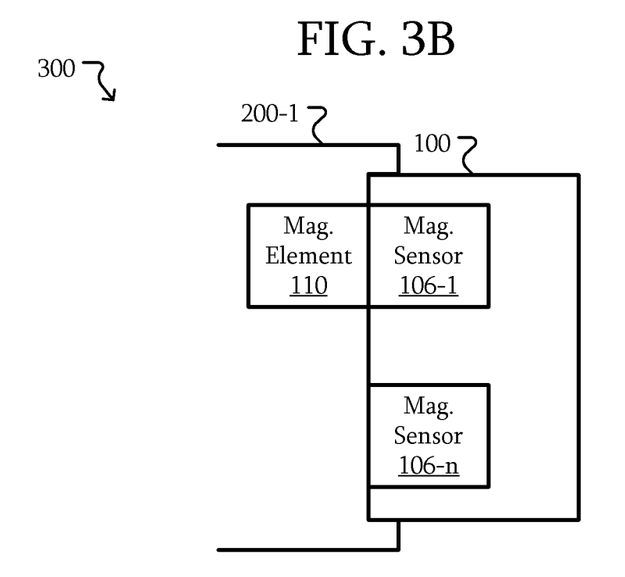

FIGS. 3A-3B are block diagrams of a system including a device with a magnetic sensor according to some embodiments. The system 300 includes a device 100 similar to the devices 100 described herein. The system 300 includes a receptacle 200-1. The receptacle 200-1 includes a location to mount the device 100. The receptacle 200-1 includes a magnetic element 110. The magnetic element 110 may include a fixed magnet or a controllable magnet such as an electromagnet. In an embodiment, the receptacle 200-1 may be associated with or included in a bucky.

The magnetic element 110 is disposed in a location that corresponds with one of the magnetic sensors 106 of the device 100. When the device 100 is mated with the receptacle 200-1, the magnetic element 110 is in a position such that the associated magnetic field is detected by the corresponding magnetic sensor 106-1. In this embodiment, magnetic sensor 106-1 would detect a magnetic field while magnetic sensor 106-n would not.

Figure 4A:
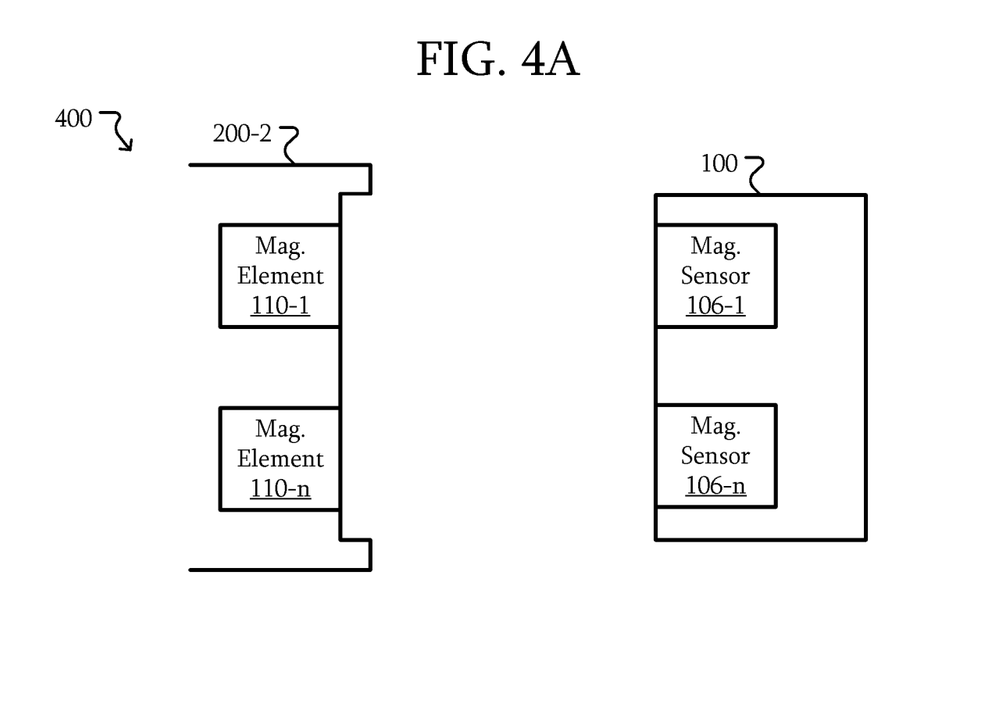
FIGS. 4A-4B are block diagrams of a system including a device with a magnetic sensor according to some other embodiments.
Figure 4B:
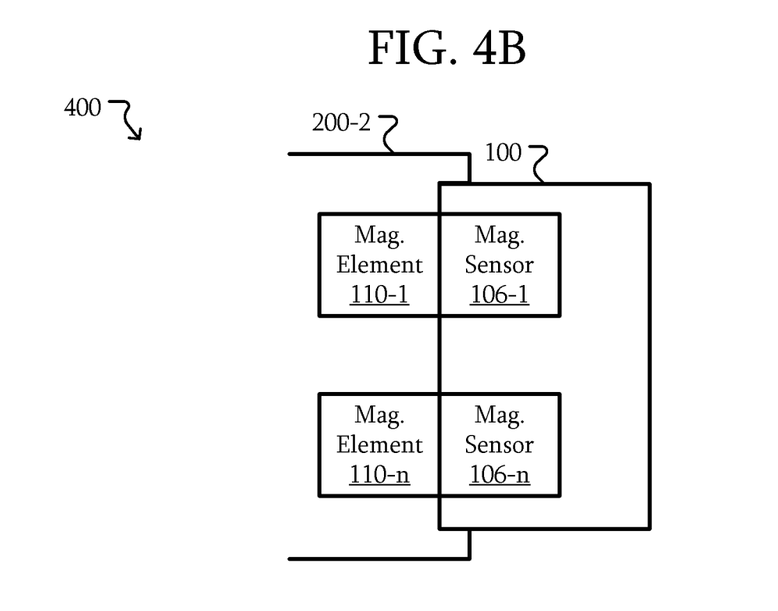

FIGS. 4A-4B are block diagrams of a system including a device with a magnetic sensor according to some other embodiments. The system 400 may be similar to the system 300 described above. The system 400 includes the same device 100. However, the system 400 includes a different receptacle 200-2. The receptacle 200-2 includes multiple magnetic elements 110. Here the receptacle 200-2 includes magnetic elements 110-1 to 110-n. The magnetic elements 110-1 to 110-n are disposed in positions corresponding to the magnetic sensors 106-1 to 106-n.

When the device 100 is mated with the receptacle 200-2, a different combination of magnetic sensors 106 of the device 100 detect magnetic fields that when the device 100 is mated with the receptacle 200-1 of FIG. 3A-3B.

In some embodiments, when the magnetic elements 110 of systems 300 and 400 are fixed magnets (e.g., permanent magnets), the device 100 will detect a different state of magnetic fields. In an example where n is 2, in receptacle 200-1, the device 100 will detect a magnetic field for magnetic sensor 106-1 but not magnetic sensor 106-2. When the device 100 is in receptacle 200-2, the device 100 will detect a magnetic field for both magnetic sensors 106-1 and 106-2. The presence or absence of magnetic fields allows for four different sets of states with the two sensors.

| Mag Sensor 106-1 State | Mag Sensor 106-2 State | Configuration |
| --- | --- | --- |
| Off | Off | Default |
| Off | On | Configuration 1 |
| On | Off | Configuration 2 |
| On | On | Configuration 3 |

The table above shows four different configurations possible for the four different states. In some embodiments, each configuration is associated with a combination of data such as firmware, addresses, identifiers, passwords, commands, instructions, settings, or the like as described above. Each unique set of magnetic fields detected (i.e., discrete states producing a threshold of magnetic flux) by a plurality of magnetic sensors 106 may be associated with one of the configurations. State refers to the detection of magnetic fields by a magnetic sensor 106 or a combination of magnetic fields sensed by a plurality of magnetic sensors 106-1 to 106-n, such as when the magnetic field is generated by a magnetic element 110. When the control logic 104 of the device 100 detects one of the sets of the states, the control logic 104 may be configured to select the configuration associated with that set of states and apply the associated data to the circuit 102. While two magnetic sensors 106 have been used as an example, in other embodiments, more magnetic sensors 106 may be used to allow for $2^n$ sets of states and associated configurations where n is the number of magnetic sensors 106.

Referring to FIGS. 3A-4B, the magnetic elements 110-$n$ may be magnetic element 100-2. Each of the magnetic elements 110, 110-1, and 110-2 may fixed magnets. Thus, with receptacle 200-1, a magnetic field may be sensed by magnetic sensor 106-1 but not by magnetic sensor 106-2. Thus, data associated with configuration 2 may be loaded. However, if the same device 100 is moved to the receptacle 200-2, both magnetic sensors 106-1 and 106-2 may sense magnetic fields. Thus, data associated with configuration 3 may be loaded.

Figure 5A:
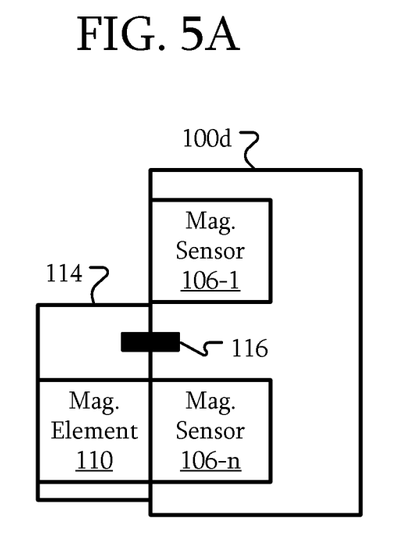
FIGS. 5A-5B are block diagrams of device with a magnetic sensor and a user interface in different configurations according to some embodiments.
Figure 5B:
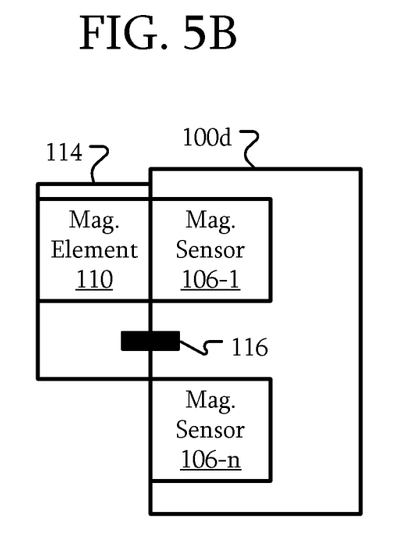

FIGS. 5A-5B are block diagrams of device with a magnetic sensor and a user interface in different configurations according to some embodiments. The device 100$d$ may be coupled to a mechanical user interface 114. The user interface 114 may include a structure or other device that a user may manipulate. In this example, the user interface 114 includes a movable structure that includes a magnetic element 110. A user may manipulate the user interface 114 to move the magnetic element 110 to be in a position corresponding to one of the magnetic sensors 106 of the device 100$d$. For example, the user may rotate the user interface 114 around a pivot point 116. Although a single magnetic element 110 is used as an example, in other embodiments, the user interface 114 may include multiple magnetic elements 110.

In some embodiments, multiple magnetic elements 110 may be included in the user interface in a sufficient number and configuration that the user interface is positionable in $2^n$ configurations. In each of the positions, the magnetic elements 110 of the user interface 114 may be disposed relative to the magnetic sensors 106-1 to 106-$n$ to activate the magnetic sensors 106-1 to 106-$n$ in one of the unique $2^n$ sets of states.

In some embodiments, the magnetic elements 110 of the user interface 114 may be controllable. For example, the magnetic elements 110 may be coils. The user interface 114 may be configured to selectively activate the coils in response to a user input received through buttons, dials, switches, or the like on the user interface 114. In some embodiments, the user interface 114 may include a touch screen, keyboard, display, or the like similar to the user interface 107 that enables a user to selectively activate the coils or otherwise change positions configurations or the like of the magnetic elements 110.

Figure 6:
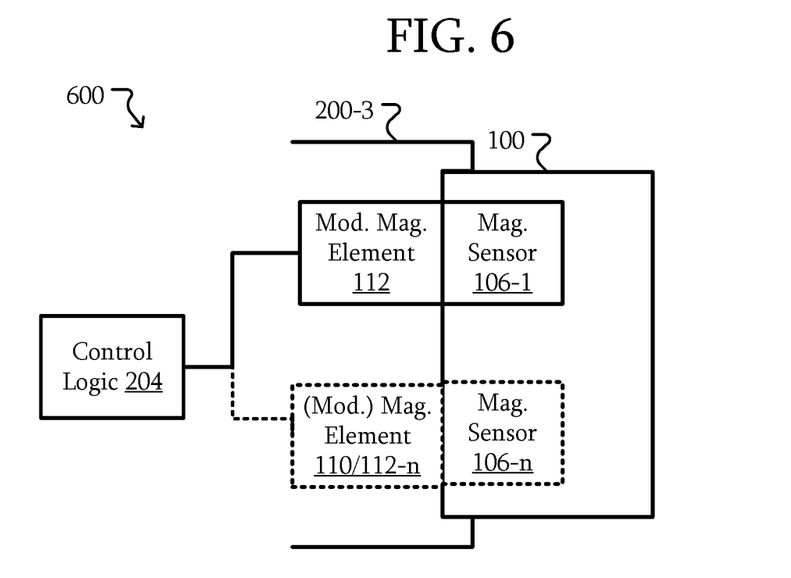
FIG. 6 is a block diagram of a system including a modulatable magnetic element and a device with a magnetic sensor according to some embodiments.

FIG. 6 is a block diagram of a system including a modulatable magnetic element and a device with a magnetic sensor according to some embodiments. In some embodiments, the system 600 may be similar to the systems 300 and 400 described above. However, the receptacle 200-3 includes a modulatable magnetic element 112. The modulatable magnetic element 112 may be configured to generate a time varying magnetic field. In some embodiments, the frequency of the variance of the magnetic field may be low enough to still penetrate an EMI shield 108 of device 100$c$ of FIG. 2.

By modulating the magnetic field through the modulatable magnetic element 112, information, configurations, associated data, or the like may be transmitted to the device 100. In some embodiments, the system 200-3 includes only one modulatable magnetic element 112 and no other magnetic elements 110 or 112. The device 100 may include only one magnetic sensor 106-1. When the device 100 is placed in different receptacles 200, the control logic 204 of that particular receptacle 200 may be configured to transmit a different signal to the device 100 through the modulatable magnetic element 112. In other embodiments, the receptacle 200-3 may include multiple modulatable magnetic elements 112, one modulatable magnetic element 112 and one or more other magnetic elements 110, multiple modulatable magnetic element 112 and one or more other magnetic elements 110, or the like.

Referring back to FIG. 5A, in some embodiments, the magnetic sensor 106 of the device 100 may be a magnetic sensor 106 that is configured to receive a modulated magnetic signal from a modulatable magnetic element 112. The user interface 114 may include the modulatable magnetic element 112 instead of the magnetic element 110. The user interface 114 may be configured to transmit a code as described above to the device 100 based on buttons, dials, switches, or the like on the user interface 114. The user interface 114 may include control logic similar to the control logic 204 described above. Thus, a user may manipulate the user interface 114 to transmit a different code base on a given input. As a result, the device 100 may be reconfigured as described above for a different application.

Figure 7:
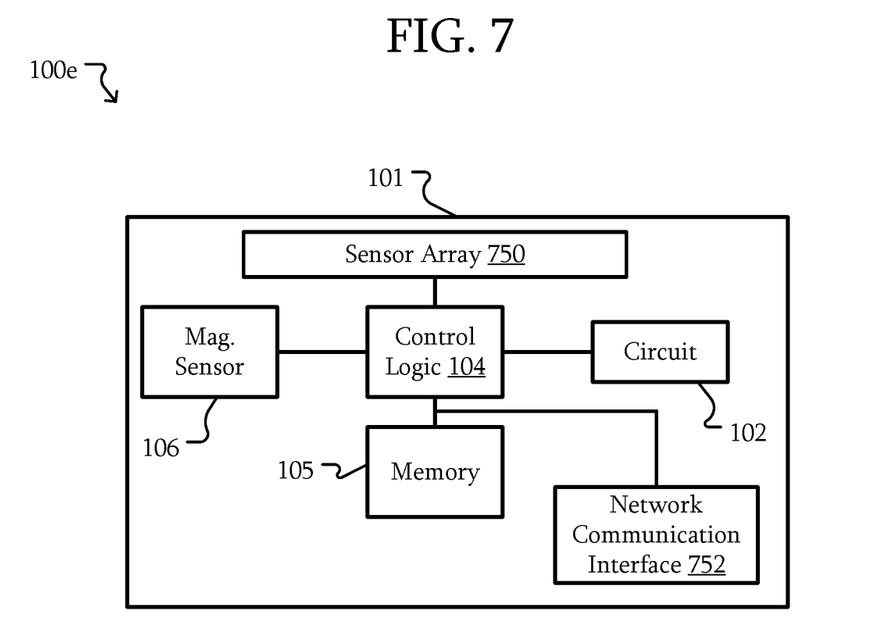
FIG. 7 is a block diagram of an x-ray detector with a magnetic sensor according to some embodiments.

FIG. 7 is a block diagram of an x-ray detector with a magnetic sensor according to some embodiments. The x-ray detector 100$e$ may include elements similar to the various devices 100 described above. The x-ray detector 100$e$ includes a sensor array 750 and a network communication interface 752. The sensor array 750 may be configured to convert incoming x-rays into an image. The sensor array 750 includes an array of pixels or sensors that are configured to convert x-rays, light, or other photons into an electrical signal, such as a charge or voltage. A scintillator, direct conversion material, or other x-ray conversion material may be part of the sensor array 750 and configured to convert incident x-rays into photons that the sensors may convert into electrical signals. For example, a scintillator may include a variety of materials configured to convert x-ray photons into photons detectable by the sensors such as cesium iodide (CsI), cadmium tungstate ($CdWO_4$), polyvinyl toluene (PVT), gadolinium oxysulfide ($Gd_2O_2S$; GOS; Gadox), gadolinium oxysulfide doped with terbium ($Gd_2O_2S$:Tb), or the like. Examples of direct conversion materials include cadmium telluride (CdTe), cadmium zinc telluride (CdZnTe or CZT), mercury iodide (HgI), lead iodide (PbI), selenium, or the like.

The network communication interface 752 may include any communication interface, such as WiFi, Ethernet, zigbee, infrared, Z-wave, Bluetooth, near field communications (NFC), or the like. The control logic 104 may be configured to transmit an image generated in response to the sensor array 750 through the network communication interface 752.

In some embodiments, the memory 105 may store data for multiple different configurations for the network communication interface 752. The data in the configurations that may be different may include a service set identifier (SSID), network configuration, an address, a netmask, a gateway, a password, or the like. Any parameter associated with the network communication interface 752 may be part of the data associated with the configurations. Any of these data may be different for different configurations.

In some embodiments, the x-ray detector 100e may be movable between multiple locations. Using a bucky in a stationary x-ray system and a mobile cart as two possible locations, the memory 105 may store data for different configurations for the stationary x-ray system and the mobile cart. Each of the bucky and the cart may include different configurations of magnetic elements 110 similar to 200-1 and 200-2 as described above. Alternatively, one may include magnetic elements 110 similar to 200-1 and 200-2 while another has a modulatable magnetic element 122.

In some embodiments, the x-ray detector 100e should be on a particular subnet, wireless or ethernet network, and/or have a particular address when placed in the bucky. When the x-ray detector 100e is placed in a mobile cart the x-ray detector 100e should be on a different subnet, different wireless network, and/or have a different address. The x-ray detector 100e may be automatically reconfigured when the different configuration of magnetic elements 110 or a different code transmitted through the modulatable magnetic element 112 when the x-ray detector 100e is placed in a new location. Alternatively, the x-ray detector 100e may include a user interface 114 as described above that may be reconfigured as the x-ray detector 100e is moved from the bucky to the mobile cart or vice versa. Regardless, the x-ray detector 100e may be automatically reconfigured to be used in the new location.

In some embodiments, a system may be retrofit to operate as described above. A detector may include magnetic sensor 106. By reconfiguring the software of the device 100 and providing the various configurations and associated data described above, the device 100 may be able to be used as described above. A receptacle of a system may be modified to be a receptacle 200 having the magnetic elements 110/112 described above. Thus, the system may operate as described above when the device 100 and receptacle 200 are mated.

In some embodiments, the magnetic sensors 106 may be configured for a different function before the retrofit. A setting of the device 100 may be added so that the device 100 may use the magnetic signals to switch between being configured to perform the different function or being configured to operate as described above.

Accordingly, in some embodiments, a device 100 may be formed by reconfiguration of the software or firmware without any hardware changes. Some modification of the receptacles 200 may be performed to add magnetic elements 110/112. However, the device 100 hardware need not be redesigned.

Figure 8A:
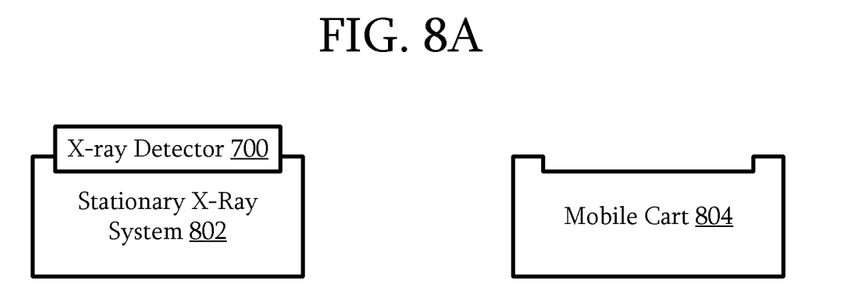
FIGS. 8A-8B are block diagrams of an x-ray detector with a magnetic sensor movable between different locations according to some embodiments.
Figure 8B:
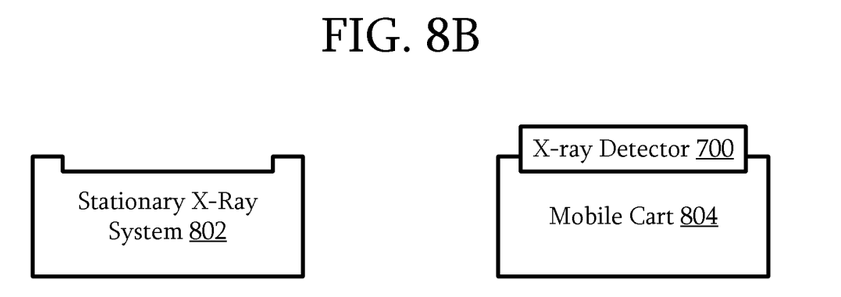

FIGS. 8A-8B are block diagrams of an x-ray detector with a magnetic sensor movable between different locations according to some embodiments. In some embodiments, an x-ray detector 100e as described above may be installed in a stationary x-ray system 802. The stationary x-ray system 802 may include a bucky with magnetic elements 110/112 as described above. The x-ray detector 100e may operate appropriately for the x-ray system 802 based on signals received from the magnetic elements 110/112.

The same x-ray detector 100e may be moved from the stationary x-ray system 802 to a mobile cart 804. The x-ray detector 100e may then be reconfigured to operate differently and appropriately for the mobile cart 804 in response to different magnetic elements 110/112, different signals received from the magnetic elements 110/112, or the like as described above.

Although moving the x-ray detector 100e from the stationary x-ray system 802 to the mobile cart 804 has been used as an example, the x-ray detector 100e may be moved back to the stationary x-ray system 802, moved to a different stationary x-ray system 802, moved to a different mobile cart 804, moved to a different type of system, or the like. In some embodiments, in each different system, the x-ray detector 100e may then be reconfigured to operate differently and appropriately for the particular system in response to different magnetic elements 110/112, different signals received from the magnetic elements 110/112, or the like in that particular system as described above.

Figure 9:
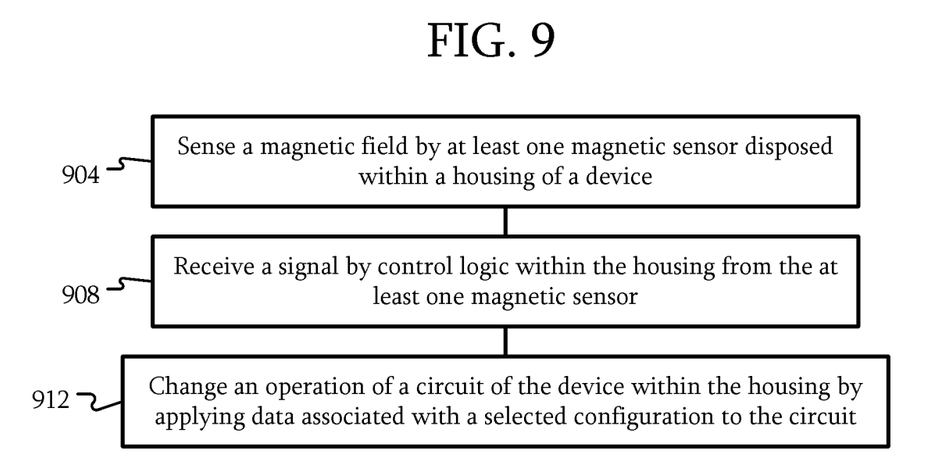
FIGS. 9-13 are flowcharts of techniques of operating a device according to some embodiments.

FIGS. 9-13 are a flowcharts of techniques of operating a device according to some embodiments. Referring to FIGS. 1A and 9, the device 100a will be used as an example. In some embodiments, in 904 a magnetic field is sensed by at least one magnetic sensor 106 disposed within a housing 101 of a device 100a. The sensing of a magnetic field may include sensing no magnetic field.

In 908, a signal is received by control logic 104 within the housing 101 from the at least one magnetic sensor 106. For example, each magnetic sensor 106 may convert the corresponding magnetic field into a signal. The signal may represent a static magnetic field, a dynamic magnetic field, no magnetic field, or the like. That signal may be received by the control logic 104.

In 912, an operation of a circuit 102 of the device 100a within the housing 101 is changed in response to the signal received from the least one magnetic sensor 106. For example, the control logic 104 may be configured to interpret, decode, or the like the signal received through the one or more magnetic sensors 106 and change the configuration of the circuit 102 by applying the data associated with the selected configuration to the circuit. In response to the changed data, the operation of the circuit 102 may be changed.

In some embodiments, in 908, the signal that is received is a modulated signal from the at least one magnetic sensor 106. The operation that is changed in 912 is based on the modulated signal. For example, the control logic 104 may demodulate the modulated signal from the at least one magnetic sensor 106 to generate a code, a value, or other data. That data may be used to determine how to change the operation of the circuit 102 in 912.

Referring to FIGS. 1B and 9, the device 100b will be used as an example. In some embodiments, in 904 magnetic fields are sensed by each of the magnetic sensors 106-1 to 106-n. In 908 the control logic 104 receives a signal from each of the magnetic sensors 106-1 to 106-n. The operation in 912 that is changed may be based on the signals received from each of the magnetic sensors 106-1 to 106-n. While in some embodiments, all signals from all magnetic sensors 106-1 to 106-n may be used to change the operation in 912, in other embodiments, less than all of the signals may be used.

Figure 10:
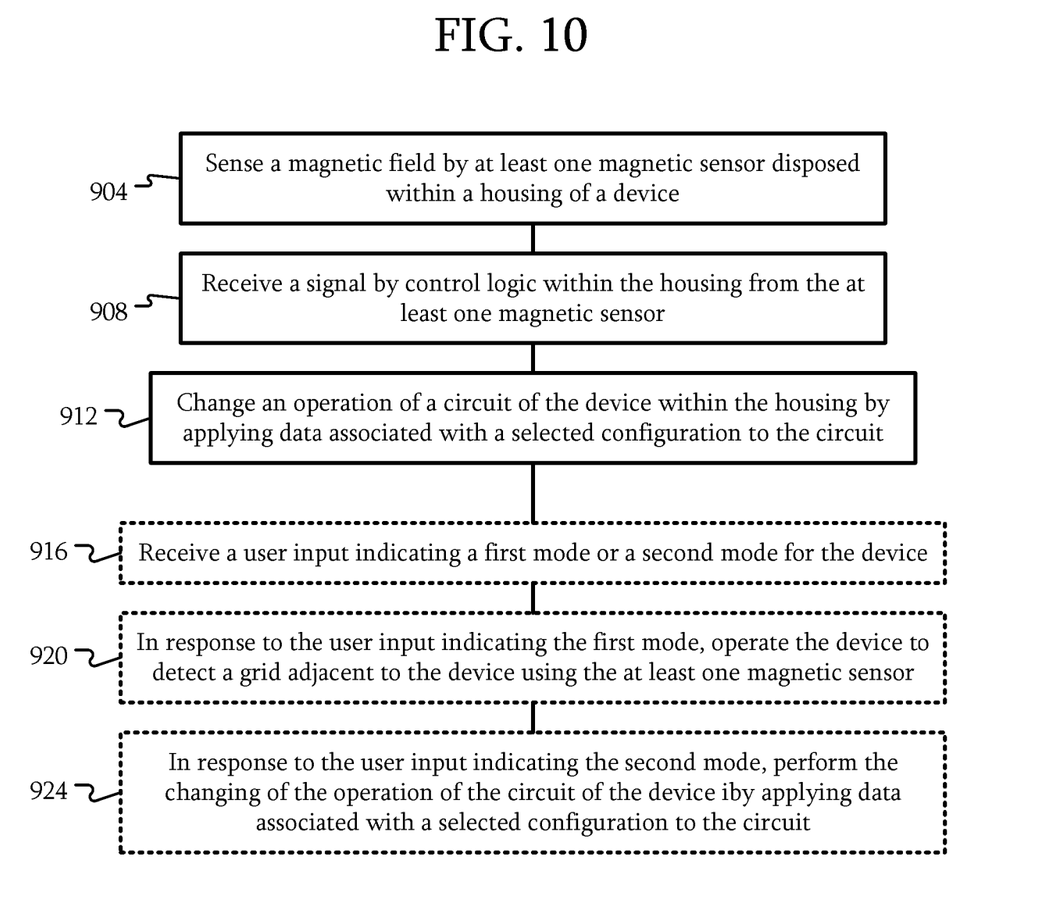

Referring to FIGS. 1A, 7, and 10, the devices 100a and 100e will be used as examples. In some embodiments, the operation may be similar to that described with respect to FIG. 9. However, in 916, a user input indicating a first mode or a second mode for operation of the device 100a is received. For example, a user may be able to configure the device 100a through the user interface 107. The user interface 107 may include an option to change the operation of the device 100a among to multiple modes, such as a first mode and a second mode. The multiple modes may define how the device 100a operates in response to inputs, such as inputs received through the magnetic sensors 106. Different modes may be defined by different configurations similar to the configurations described above for the circuit 102 such as different firmware or software, defined by different subroutines of currently operating software, or the like. In 920, in response to the user input indicating the first mode, the device 100*a* may be operated to detect a scatter grid adjacent to the device 100*a* using the at least one magnetic sensor 106. For example, the scatter grid (also referred to as a "grid") is a device between the object or patient and detector for limiting the amount of scattered radiation reaching the detector, thereby improving the quantity of diagnostic x-ray images. Conventional grids are typically constructed of a series of alternating parallel strips of lead (Pb; or other dense metal) and a radiolucent substance such as a plastic, carbon fiber, aluminum, even paper. In a particular example, the device 100*a* may include an x-ray detector. The x-ray detector may operate in the first mode to use the at least one magnetic sensor 106 to detect the presence of a grid. The operation of the device 100*a* may change based on the detected presence or absence of the grid.

In 924, in response to the user input indicating the second mode, the changing of the operation of the circuit 102 of the device 100*a* in response to the signal received from the least one magnetic sensor 106 may be performed. Using the x-ray detector as an example of the device 100*a*, in the second mode, the at least one magnetic sensor 106 may be used to change the operation of the x-ray detector 100*a* rather than being used to detect a presence of a grid.

Accordingly, the device 100*a* may be switched between two modes where a magnetic sensor 106 is used in a manner similar to an existing device with a magnetic sensor. However, through the user interface 107, the device 100*a* may be operated in a different mode where the magnetic sensor 106 may be used to change the operation of the device 100*a* as described above.

Figure 11:
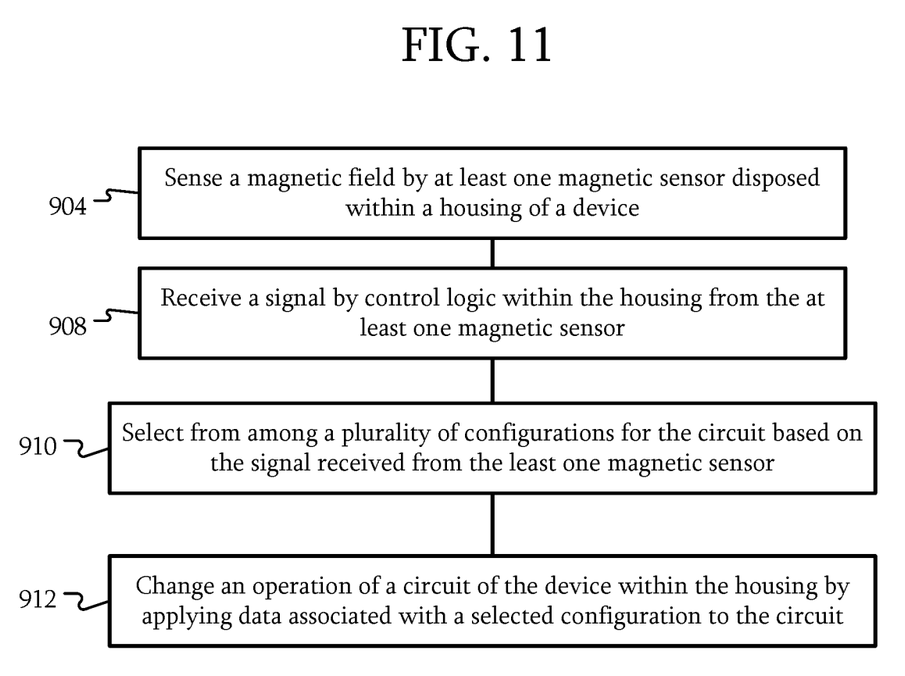

Referring to FIGS. 1A and 11, the device 100*a* will be used as an example. In some embodiments, the operations may be similar to those described above with respect to FIG. 9. However, in 910, a configuration is selected from among multiple configurations for the circuit 102 based on the signal received from the least one magnetic sensor 106. For example, as described above, multiple configurations may be stored in the memory 105. A signal from the at least one magnetic sensor 106 may be converted into an index into a list of configurations stored in the memory 105. The control logic 104 may change the operation of the circuit 102 in 912 in response to the selected configuration by applying data associated with a selected configuration to the circuit 102. For example, the control logic 104 may load firmware, data, or the like into the circuit 102 to change the operation.

Referring to FIGS. 7 and 11, in some embodiments, the data of each of the configurations includes a set of parameters for a network communication interface 752 of the device 100*e*. For at least one of the configurations, the set of parameters is different from a set of parameters for another one of the configurations. As described above, the configurations may include a variety of network related parameters. One configuration may have a first address and a first gateway while another configuration has a second address and a second gateway. The control logic 104 may be configured to reconfigure the network communication interface 752 with the different set of parameters.

Figure 12:
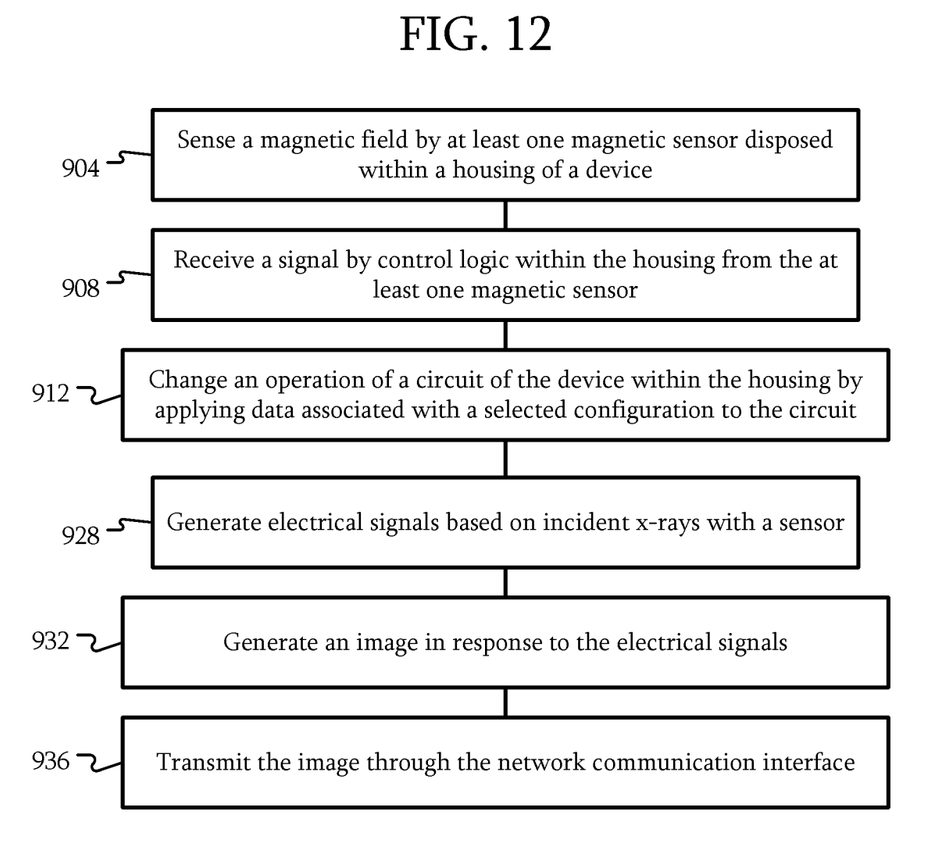

Referring to FIGS. 7 and 12, the x-ray detector 100*e* will be used as an example of a device 100*e*. In some embodiments, the operations may be similar to that described with respect to FIG. 9. However, in 928, electrical signals are generated based on incident x-rays with a sensor 750. In 932, an image is generated in response to the electrical signals. In 936, the image is transmitted through the network communication interface 752. As described above, configuration of the network communication interface 752 may be changed. The image may be communicated to a different server, over a different network, or the like based on the change. In some embodiments, no change to the operations in 932 and 926 may occur due to the change in the operation of the circuit 102 in 912; however, in other embodiments, operations may be different. That is, in some embodiments, the image may be generated in the same way but transmitted differently while in other embodiments, the image may be generated differently.

Figure 13:
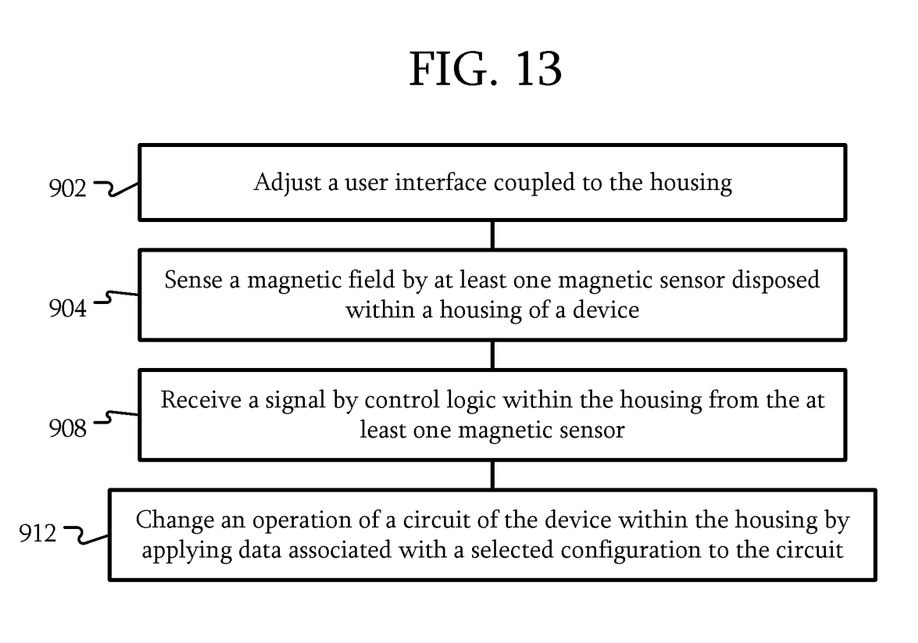

Referring to FIGS. 5A, 5B and 13, the device 100*d* will be used as an example. The operations may be similar to those described with respect to FIG. 9. However, in 902, a user interface 114 coupled to the housing may be adjusted. For example, the user interface 114 may be manipulated such that the magnetic element 110 is positioned in a particular state. As a result, the magnetic sensors 106-1 to 106-*n* may each receive a magnetic field that is different that in other states of the user interface 114.

Figure 14:
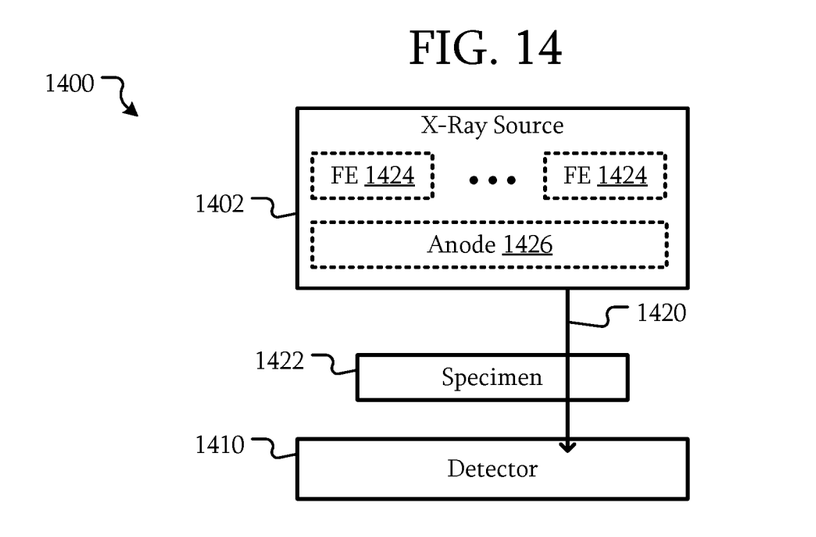
FIG. 14 is a block diagram of an x-ray imaging system according to some embodiments

FIG. 14 is a block diagram of an x-ray imaging system according to some embodiments. The x-ray imaging system 1400 includes an x-ray source 1402 and detector 1410. The x-ray source 1402 may include a device 100 or the like as described above. In some embodiments, the x-ray source 1402 includes multiple field emitters (FE) 1424. Electron beams from the field emitters 1424 may be directed towards an anode 1426 to generate x-rays 1420. The x-ray source 1402 is disposed relative to the detector 1410 such that x-rays 1420 may be generated to pass through a specimen 1422 and detected by the detector 1410. In some embodiments, the detector 1410 is part of a medical imaging system. In other embodiments, the x-ray imaging system 1400 may include a portable vehicle scanning system as part of a cargo scanning system. The system 1400 may be any system that may include an x-ray detector.

Some embodiments include a device, comprising: a housing 101; a circuit 102 disposed in the housing 101, including a sensor array 750 configured to generate electrical signals based on incident x-rays; a memory 105 configured to store data for a plurality of configurations for the circuit 102; at least one magnetic sensor 106 disposed in the housing 101; control logic 104 disposed in the housing 101 and configured to: receive a signal from the at least one magnetic sensor 106; select from among the configurations for the circuit 102 based on the signal received from the least one magnetic sensor 106; and change an operation of the circuit 102 by applying the data associated with the selected configuration to the circuit 102.

In some embodiments, the circuit 102 includes a network communication interface 752; the data associated with each of the configurations includes a set of parameters for the network communication interface 752; and for at least one of the configurations, the set of parameters is different from a set of parameters for another one of the configurations.

In some embodiments, the device further comprises wherein the control logic 104 is further configured to: generate an image in response to the electrical signals; and transmit the image through the network communication interface 752.

In some embodiments, the control logic 104 is further configured to: receive a modulated signal as the signal received from the at least one magnetic sensor 106; and select from among the configurations for the circuit 102 in response to the modulated signal.

In some embodiments, the at least one magnetic sensor 106 comprises only a single magnetic sensor 106.

Some embodiments include a system including a device as described herein and further comprising: a receptacle configured to receive the device; system control logic 104;

and a magnetic element 110/112; wherein the system control logic 104 is configured to: transmit a code to the control logic 104 of the device through the magnetic element 110/112 and the at least one magnetic sensor 106.

In some embodiments, the at least one magnetic sensor 106 comprises a plurality of magnetic sensors 106; and the control logic 104 is configured to select from among the configurations for the circuit 102 in response to signals received from each of the plurality of magnetic sensors 106.

In some embodiments, the device further comprises a user interface 114 coupled to the housing 101; and at least one magnetic element 110; wherein: the at least one magnetic element 110 is configurable in response to the user interface 114 to be positioned relative to the magnetic sensors 106 such that signals received from each of the plurality of magnetic sensors 106 are in different states for at least two positions of the at least one magnetic element 110.

In some embodiments, the device further comprises a user interface 114 coupled to the housing 101 and including at least one magnetic element 110 including a magnetic element 112; wherein the control logic 104 is further configured to: receive a modulated signal from the magnetic element 112 as the signal received from the at least one magnetic sensor 106; and select from among the configurations for the circuit 102 in response to the modulated signal.

In some embodiments, the device further comprises an electromagnetic interference (EMI) shield 108 surrounding the circuit 102 and the at least one magnetic sensor 106.

Some embodiments include a method, comprising: sensing a magnetic field by at least one magnetic sensor 106 disposed within a housing 101 of a device; storing data for a plurality of configurations for a circuit 102 including a sensor array 750 configured to generate electrical signals based on incident x-rays disposed within the housing 101 of the device; receiving a signal by control logic 104 within the housing 101 from the at least one magnetic sensor 106; selecting from among the configurations for the circuit 102 based on the signal received from the least one magnetic sensor 106; and changing an operation of the circuit 102 by applying the data associated with the selected configuration to the circuit 102.

In some embodiments, the method further comprises receiving a user input indicating a first mode or a second mode for the device; in response to the user input indicating the first mode, operating the device to detect a grid adjacent to the device using the at least one magnetic sensor 106; and in response to the user input indicating the second mode, performing the changing of the operation of the circuit 102 by applying the data associated with the selected configuration to the circuit 102.

In some embodiments, the data of each of the configurations includes a set of parameters for a network communication interface 752 of the device; and for at least one of the configurations, the set of parameters is different from a set of parameters for another one of the configurations.

In some embodiments, the method further comprises generating an image in response to the electrical signals; and transmitting the image through the network communication interface 752.

In some embodiments, receiving the signal by the control logic 104 comprises receiving a modulated signal as the signal from the at least one magnetic sensor 106; and selecting from among the configurations for the circuit 102 comprises selecting from among the configurations for the circuit 102 in response to the modulated signal.

In some embodiments, the at least one magnetic sensor 106 is part of a plurality of magnetic sensors 106 disposed within the housing 101; receiving the signal by the control logic 104 comprises for each of the magnetic sensors 106, receiving a corresponding signal from the magnetic sensor 106; and selecting from among the configurations for the circuit 102 comprises selecting from among the configurations for the circuit 102 in response to the corresponding signals received from each of the magnetic sensors 106.

In some embodiments, the method further comprises adjusting a user interface 114 coupled to the housing 101, the user interface including at least one magnetic element 110 such that the user interface 114 is positionable in a plurality of states and for each of the states the at least one magnetic element 110 is in a different position relative to the at least one magnetic sensor 106.

In some embodiments, sensing the magnetic field by the at least one magnetic sensor 106 comprises sensing the magnetic field through an electromagnetic interference (EMI) shield surrounding the circuit 102 and the at least one magnetic sensor 106.

Some embodiments include a device, comprising: means for operating the device disposed within a housing of the device; means for sensing incident x-rays and generating electrical signals based on the incident x-rays; means for sensing a magnetic field disposed within the housing of the device; means for receiving a signal within the housing from the means for sensing the magnetic field; and means for changing an operation of the means for operating the device within the housing in response to the signal received from the means for sensing the magnetic field.

Examples of the means for operating the device disposed within a housing of the device include the control logic 104, the circuit 102, the memory 105, or the like.

Examples of the means for sensing incident x-rays and generating electrical signals based on the incident x-rays include the sensory array 750, the control logic 104, or the like.

Examples of the means for sensing a magnetic field disposed within the housing of the device include the magnetic sensor 106, the control logic 104, or the like.

Examples of the means for receiving a signal within the housing from the means for sensing the magnetic field include the control logic 104 or the like.

Examples of the means for changing an operation of the means for operating the device within the housing in response to the signal received from the means for sensing the magnetic field include the control logic 104, the memory 105, the circuit 102, or the like.

In some embodiments, the device further comprises means for shielding from electromagnetic interference surrounding the means for sensing the magnetic field and the means for operating the device. Examples of the means for shielding from electromagnetic interference surrounding the means for sensing the magnetic field and the means for operating the device include the EMI shield 108.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. A device, comprising:
a housing;
a circuit disposed in the housing, the circuit including a sensor array configured to generate electrical signals based on incident x-rays, the circuit comprising a network communication interface;
a memory configured to store data for a plurality of configurations for the circuit, the data for each of the plurality of configurations comprising a set of parameters for the network communication interface, wherein a first set of parameters for a first configuration of the plurality of configurations is different from a second set of parameters for a second configuration of the plurality of configurations;
at least one magnetic sensor disposed in the housing;
control logic disposed in the housing and configured to:
receive a signal from the at least one magnetic sensor;
select from among the configurations for the circuit based on the signal received from the least one magnetic sensor; and
change an operation of the circuit by applying the data associated with the selected configuration to the circuit.

2. The device of claim 1, further comprising:
wherein the control logic is further configured to:
generate an image in response to the electrical signals; and
transmit the image through the network communication interface.

3. The device of claim 1, wherein:
the control logic is further configured to:
receive a modulated signal as the signal received from the at least one magnetic sensor; and
select from among the configurations for the circuit in response to the modulated signal.

4. The device of claim 3, wherein:
the at least one magnetic sensor comprises only a single magnetic sensor.

5. A system including the device of claim 3, the system further comprising:
a receptacle configured to receive the device;
system control logic; and
a modulatable magnetic element;
wherein the system control logic is configured to:
transmit a code to the control logic of the device through the modulatable magnetic element and the at least one magnetic sensor.

6. The device of claim 1, wherein:
the at least one magnetic sensor comprises a plurality of magnetic sensors; and
the control logic is configured to select from among the configurations for the circuit in response to signals received from each of the plurality of magnetic sensors.

7. The device of claim 6, further comprising:
a user interface coupled to the housing; and
at least one magnetic element;
wherein:
the at least one magnetic element is configurable in response to the user interface to be positioned relative to the magnetic sensors such that signals received from each of the plurality of magnetic sensors are in different states for at least two positions of the at least one magnetic element.

8. The device of claim 1, further comprising:
a user interface coupled to the housing and including at least one magnetic element including a modulatable magnetic element;
wherein the control logic is further configured to:
receive a modulated signal from the modulatable magnetic element as the signal received from the at least one magnetic sensor; and
select from among the configurations for the circuit in response to the modulated signal.

9. The device of claim 1, further comprising:
an electromagnetic interference (EMI) shield surrounding the circuit and the at least one magnetic sensor.

10. A method, comprising:
sensing a magnetic field by at least one magnetic sensor disposed within a housing of a device;
storing data for a plurality of configurations for a circuit including a sensor array configured to generate electrical signals based on incident x-rays disposed within the housing of the device;
receiving a signal by control logic within the housing from the at least one magnetic sensor;
selecting from among the configurations for the circuit based on the signal received from the least one magnetic sensor;
changing an operation of the circuit by applying the data associated with the selected configuration to the circuit; and
adjusting a user interface coupled to the housing, the user interface including at least one magnetic element such that the user interface is positionable in a plurality of states and for each of the states the at least one magnetic element is in a different position relative to the at least one magnetic sensor.

11. The method of claim 10, further comprising:
receiving a user input indicating a first mode or a second mode for the device;
in response to the user input indicating the first mode, operating the device to detect a grid adjacent to the device using the at least one magnetic sensor; and in response to the user input indicating the second mode, performing the changing of the operation of the circuit by applying the data associated with the selected configuration to the circuit.

12. The method of claim 10, wherein:

the data of each of the configurations includes a set of parameters for a network communication interface of the device; and for at least one of the configurations, the set of parameters is different from a set of parameters for another one of the configurations.

13. The method of claim 12, further comprising:

generating an image in response to the electrical signals; and transmitting the image through the network communication interface.

14. The method of claim 10, wherein:

receiving the signal by the control logic comprises receiving a modulated signal as the signal from the at least one magnetic sensor; and selecting from among the configurations for the circuit comprises selecting from among the configurations for the circuit in response to the modulated signal.

15. The method of claim 10, wherein:

the at least one magnetic sensor is part of a plurality of magnetic sensors disposed within the housing;

receiving the signal by the control logic comprises for each of the magnetic sensors, receiving a corresponding signal from the magnetic sensor; and selecting from among the configurations for the circuit comprises selecting from among the configurations for the circuit in response to the corresponding signals received from each of the magnetic sensors.

16. The method of claim 10, wherein:

sensing the magnetic field by the at least one magnetic sensor comprises sensing the magnetic field through an electromagnetic interference (EMI) shield surrounding the circuit and the at least one magnetic sensor.

17. A device, comprising:

a circuit for operating a device, the circuit disposed within a housing of the device;

a sensor array for sensing incident x-rays and generating electrical signals based on the incident x-rays;

magnetic sensors for sensing magnetic fields, the magnetic sensors disposed within the housing of the device; and a control logic for receiving signals from each of the magnetic sensors, the control logic disposed within the housing of the device, the control logic selecting from among a plurality of configurations for the circuit in response to the signals received from each of the magnetic sensors.

18. The device of claim 17, further comprising:

an electromagnetic interference shield surrounding the sensor array and the circuit.

* * * * *